Figure 5:
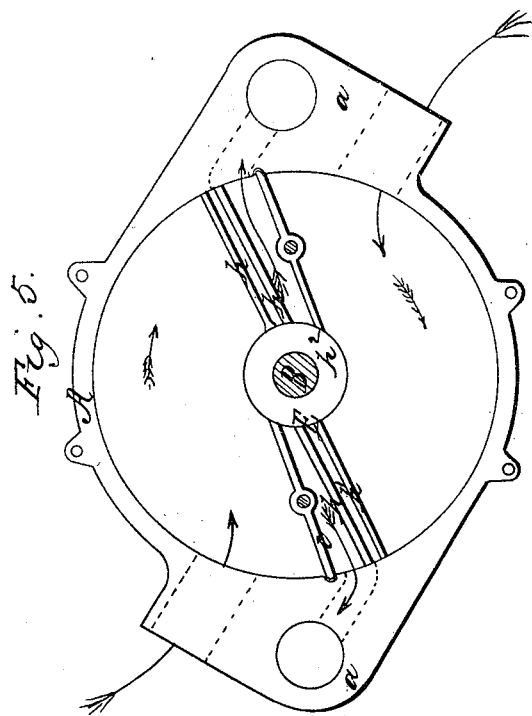

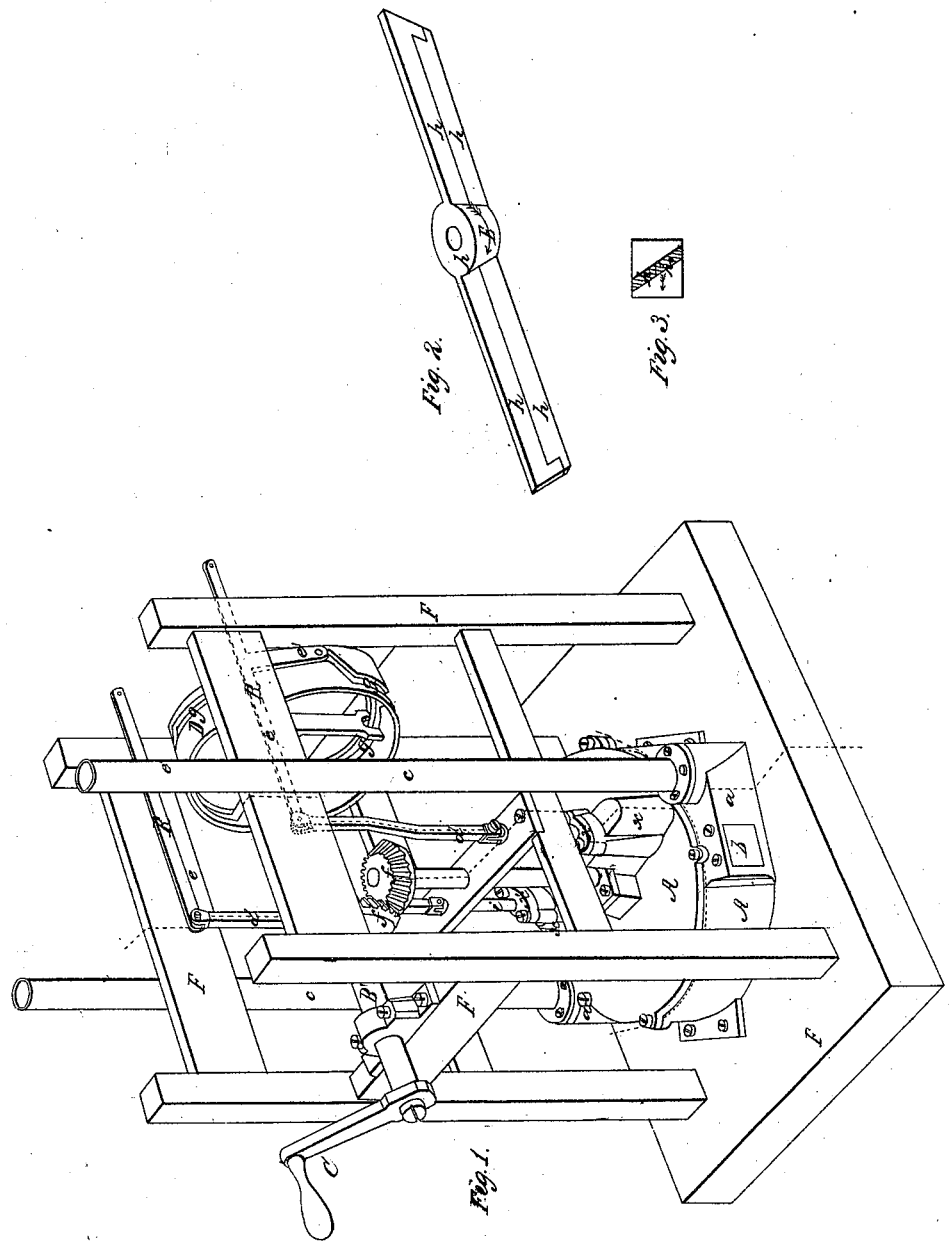

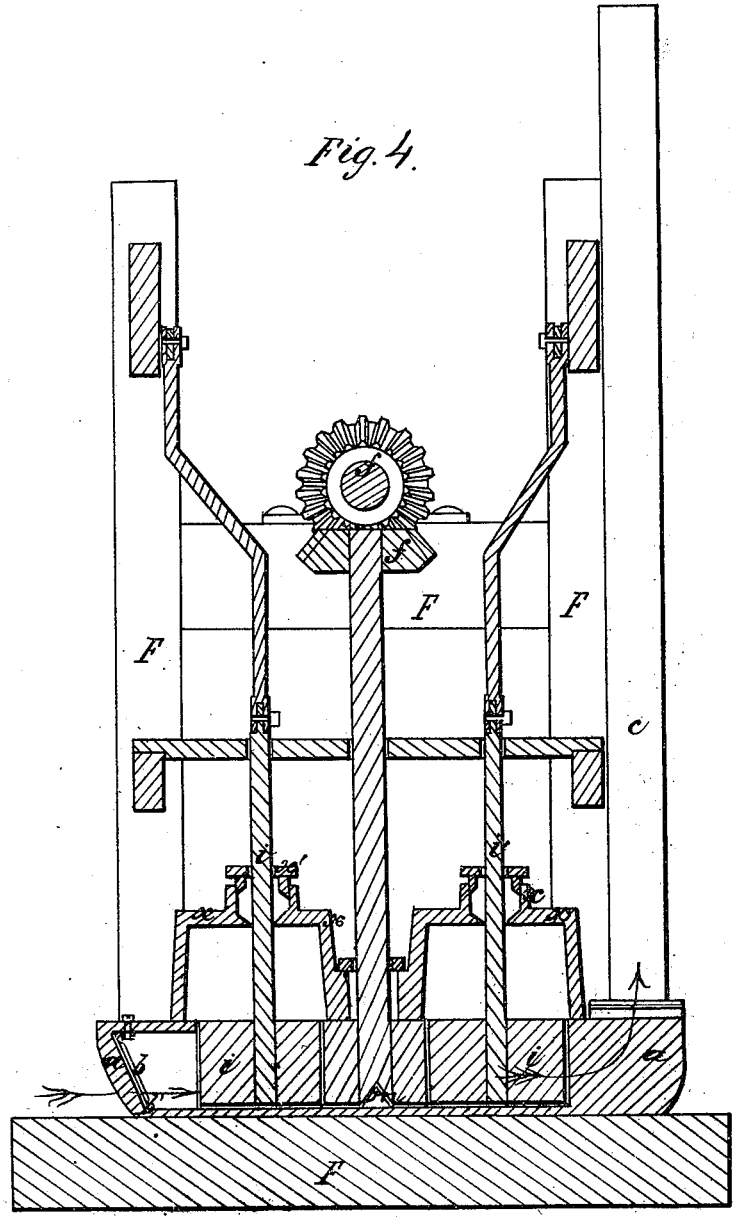

3 Sheets-Sheet 3.

P. Sweeney.
Rotary Pump.

N°6,906.      Patented Nov. 27, 1849.

UNITED STATES PATENT OFFICE.

PETER SWEENEY, OF BUFFALO, NEW YORK.

ROTARY PUMP.

Specification of Letters Patent No. 6,906, dated November 27, 1849.

*To all whom it may concern:*

Be it known that I, PETER SWEENEY, of Buffalo, in the county of Erie and State of New York, have invented a new and useful Improvement in Rotary Pumps, of which the following is a full, clear, and exact description, reference being had to the accompanying drawing, forming part of this specification, in which—

Figure 1 is a perspective view of my rotary pump; Fig. 2 is a perspective view of the piston detached; Fig. 3, a section of the same at the line $x\ x$ of Fig. 2; Fig. 4 is a vertical section through the line # # of Fig. 1, and Fig. 5 is a horizontal section through the line $o\ o$ of Fig. 1.

My invention consists in constructing the revolving piston in such manner that it shall yield to and pass by any obstruction which may lodge in its passage through the pump chamber, and which would otherwise injure the pump. Likewise in so connecting the valves with a double cam wheel that they shall be raised at the proper time to allow the piston to pass, this cam wheel being made heavy so as to serve also the purpose of a fly wheel.

In the accompanying drawings F is a frame to support the several members of the pump in their proper respective positions.

A is a hollow cylinder whose diameter greatly exceeds its length and within which turns a rotary piston. The horns or projections $a\ a$ on either side of the pump contain the entry and discharge ways and valves and have the entry and discharge pipes attached to them.

$b\ b$ are the entry valves; they are made in the usual or any convenient manner and have vulcanized Indian rubber or other elastic substance $b'$ let into their seats to shut down upon, to make a tight joint, prevent jarring, and lessen the wear of the valve.

$c\ c$ are the discharge pipes at whose junction with the horns $a\ a$ a valve is placed which opens upward to allow the water to pass up the pipe and prevent its return.

A' is the upper head of the cylinder having bonnets $x\ x$ projecting from its upper surface within which the valves ($i, i$, Figs. 4 and 5) are raised to allow the piston to pass under them, the valve stems $i\ i$ pass through stuffing boxes $x'\ x'$ in the top of the bonnets and the piston rod B also passes through a stuffing box in the head A'; these several stuffing boxes being for the purpose of making tight joints around the respective rods to prevent the water from escaping.

E is the piston; it consists of two arms $h$ projecting from a hub which is secured to the lower end of the rod B. The length from the outer end of one of these arms to the outer end of the other just equals the interior diameter of the cylinder while their width from top to bottom in a line parallel with the piston rod (B) just equals the distance between the heads of the cylinder. The arms of the piston are inclined to the heads of the cylinder, and each composed of two pieces, the upper $h$ rigidly connected with the hub $h^2$ and the lower $h'$ hung to the upper on pivots placed a little below its middle, so that the pressure of the water may preponderate on the upper side of the pivots and thereby keep the upper edge of the lower or hinged part of the arm shut against the upper or rigid part. The piston is revolved in the direction of the arrows $l$ Figs. 2, 3, and 5, and if a nail, thin piece of stone, wood, shell, or other obstruction should intervene between the lower head of the cylinder and the piston, the lower part of the arm would turn on its hinge and pass over the same instead of wedging fast and arresting the motion of the pump (an accident that not unfrequently happens in emptying the water out of sunken vessels for which this pump is chiefly designed). As soon as the hinged part of the arm has passed over an obstruction, the preponderating pressure of the water against its upper portion instantly turns it back again against the upper or hinged part of the arm. Care must be taken not to place the hinges so far below the middle of the turning part of the arms as to cause the pressure of the water on its upper half to preponderate too much because in that case the arm might be broken or damaged before it would yield.

The piston rod B rests at its lower end on a step $m$ Fig. 4 on the lower head of the cylinder, while its upper end turns in a bearing in one of the cross bars of the frame. On the upper end of the rod D a bevel wheel $f$ is secured which gears into another like bevel wheel $f$ on the horizontal or main driving shaft B' so that the motion of the piston rod B and driving shaft B' will always be the same. On one end of the driving shaft a pulley winch, or other device is secured through which motion may be communicated to it, and on its other end a fly wheel D is mounted having a flat rim, with a zig-zag slot $g$ made therein which is traversed by friction rollers attached to the vertical arms $e'$ of the bent levers R whose horizontal arms $c$ are connected by link rods $d$ with the stems of the valves $i$. This zigzag slot is of uniform width but traverses the rim in such a course, that when the wheel is revolved it will by vibrating the bent levers first one way and then the other through the medium of the link rods $d$ and stems $i'$ raise the valves $i$ up into the bonnets $x$ at the instant the arms of the piston are about to come into contact with them, will hold them up until the arms of the piston have passed under them, and then instantly lower them down again to divide the cylinder into two parts to stop the wave of water being driven before the arms, which then sweep it into the discharge pipes. The valves $i$ extend across the annular space between the hub $h^2$ of the piston and the inner periphery of the cylinder, and they should likewise be so fitted into the bonnets, to the heads and side of the cylinder, and the hub of the piston, as to make a water-tight partition dividing the cylinder into two parts. The water enters the cylinder and is discharged from the same as indicated by the arrows in Fig. 5; but as this part of the operation is the same as in other pumps of similar construction it need not be more particularly described.

I have stated that the piston is constructed of two inclined plates, as I prefer that arrangement to others but it is evident that a piston with vertical plates, arranged substantially in the manner above set forth, will answer the purpose, although not so effectually as that above described.

The pump here represented is arranged with double piston arms and valves but I contemplate constructing them with a single arm and one valve, as the arrangement is more simple.

What I claim as my invention and desire to secure by Letters Patent is—

The construction of each arm of the piston in such manner that while it is ordinarily kept in its proper position by the pressure of the water, its lower edge will yield to and pass over an obstruction which would otherwise break the pump.

PETER SWEENEY.

Witnesses:
GEORGE R. KIBBE,
WILLIAM CROOKE.